Oct. 3, 1967   C. THOMSON   3,344,956
SOLIDS HANDLING EQUIPMENT

Filed Aug. 12, 1965   4 Sheets-Sheet 1

Inventor
Charles Thomson

By
Stevens, Davis, Miller & Mosher   Attorneys

Oct. 3, 1967   C. THOMSON   3,344,956
SOLIDS HANDLING EQUIPMENT
Filed Aug. 12, 1965   4 Sheets-Sheet 2
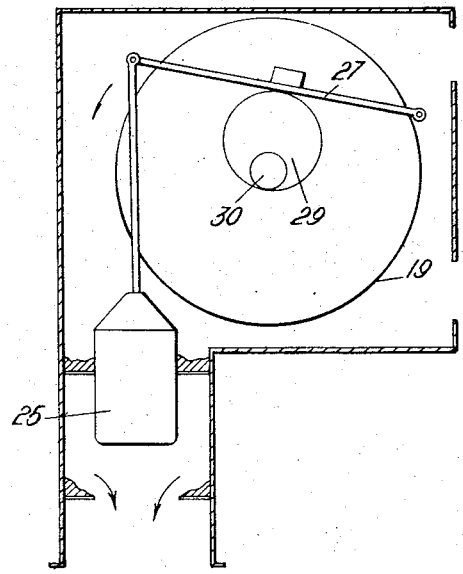
Fig. 2.
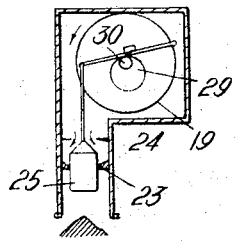
Fig. 3.
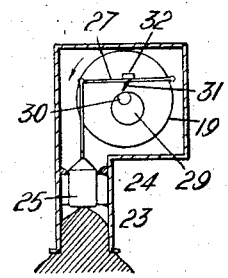
Fig. 4.
Inventor
Charles Thomson
By
Stevens, Davis, Miller & Mosher   Attorney Oct. 3, 1967 C. THOMSON 3,344,956
SOLIDS HANDLING EQUIPMENT
Filed Aug. 12, 1965 4 Sheets-Sheet 3
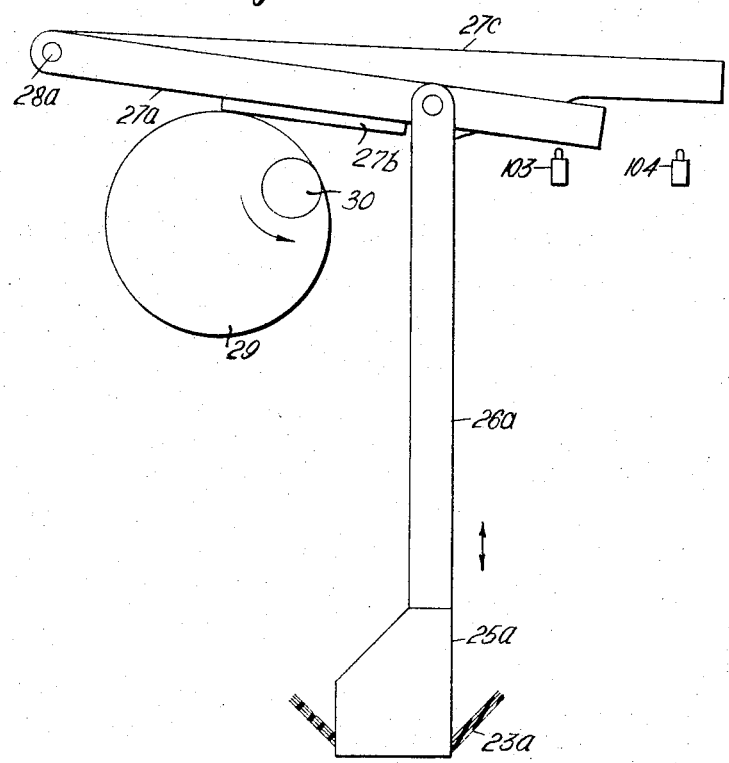
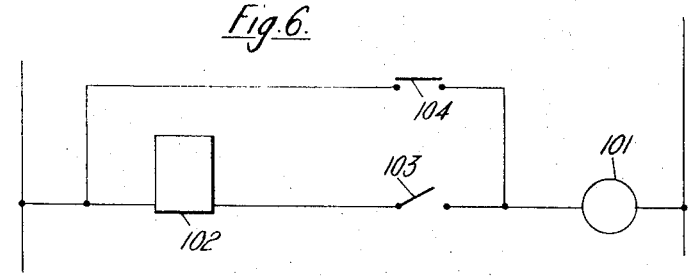
Inventor
Charles Thomson
By
Stevens, Davis, Miller & Mosher Attorneys Oct. 3, 1967  C. THOMSON  3,344,956
SOLIDS HANDLING EQUIPMENT
Filed Aug. 12, 1965  4 Sheets-Sheet 4

INVENTOR
CHARLES THOMSON
BY
*Stevens, Davis, Miller & Mosher*
ATTORNEYS

United States Patent Office 3,344,956
Patented Oct. 3, 1967

3,344,956
SOLIDS HANDLING EQUIPMENT
Charles Thomson, Esher, England, assignor to Solar Thomson Engineering Company, Limited, Cobham, England
Filed Aug. 12, 1965, Ser. No. 479,162
Claims priority, application Great Britain, June 3, 1965, 23,803/65
10 Claims. (Cl. 222—56)

This invention is concerned with solids feeding means and particularly, but not exclusively, with means for feeding solids in granular or small lump form into a hopper or other container, e.g. coal into the feed hopper of the boiler in an automatic domestic heating system.

It is an object of the prevent invention to provide means for cutting off the feed automatically when a predetermined quantity of solids have accumulated in a container.

According to the present invention, solids feeding means comprise a vertically-reciprocable closure member adapted when lowered to close an inlet and when raised to open said inlet, feed means for supplying solids above said inlet, means for reciprocating said member and thereby permitting the flow of solids down through said inlet, and means adapted to detect obstruction to downwards movement of said member by solids piled up to a pre-determined level below said inlet and as a result to actuate control means to render said feed means inoperative.

Preferably, said reciprocating means comprises an operating member connected to the closure member and a driving member adapted to engage said operating member to control raising and lowering of the closure member, said driving member being adapted to move relatively to said operating member when downwards movement of the closure member is prevented by solids below the inlet and thereby actuate said detecting means. In a preferred arrangement, said driving member comprises a cam rotatable in a vertical plane, said operating member comprises an arm supported on said cam, whereby the cam will move away from said arm if downwards movement of the closure member is prevented, and said detecting means comprises a switch arranged to be operated by said movement of the cam away from the arm.

Preferably, actuation of said control means renders said reciprocating means inoperative. Conveniently, the feed means and reciprocating means may have a common drive.

It is desirable to provide means for switching the feed means off automatically for intervals greater than would result from the operation of said detection means alone. However, a boiler feed hopper, for example, must not be allowed to become empty. A sensing device low down in the hopper would be subject to dust and mechanical damage, and control of the feed means by such a device is therefore undesirable. Therefore, said control means preferably includes a timing switch for switching the reciprocating means and feed means on and off at predetermined intervals. Advantageously, the timing switch is arranged to switch on the feed means at intervals less than the minimum time necessary for the hopper contents to be consumed and to switch the feed means off after a period sufficient to fill the hopper if empty at the time of switching on.

When feeding solids from one location to another, it may be desirable to minimise passage of air or other gas between those locations. For example, in a hopper feed type of boiler it is essential, if burn-back is to be avoided, that the opening through which fuel is fed to the boiler should not remain open for any substantial time.

Accordingly, said control means may be so arranged that irrespective of the position of the closure member when the timing switch switches off the reciprocating means continues to operate until the closure member is in position closing said inlet. Alternatively, said closure member may comprise a piston vertically reciprocable through and adapted alternately to open and close apertures in two flexible seals at the ends of a feed chamber, which seals are spaced vertically apart for a distance less than the length of the piston, the aperture in the lowermost seal constituting the aforesaid inlet and the aforesaid feed means supplying solids above the uppermost seal. Thereby, when the piston is in a lower position it closes the aperture in the lower seal and permits solids to flow down through the aperture in the upper seal into the feed chamber, and when the piston is moved upwards it closes the apertures in both seals and then opens the aperture in the lower seal while maintaining the aperture in the upper seal closed, whereby solids can flow from the feed chamber down through the aperture in the lower seal.

The following is a description, by way of example, of embodiments of the present invention. Reference is made to the accompanying schematic drawings, in which:

FIGS. 2, 3 and 4 are side views showing the solid feed means of FIG. 1 at different stages of operation;

FIGS. 5, 5a, 5b and 5c are side views of an alternative embodiment of feed means according to the invention;

FIG. 6 is a circuit diagram of the control means for the embodiment of FIG. 5.

Figure 1:
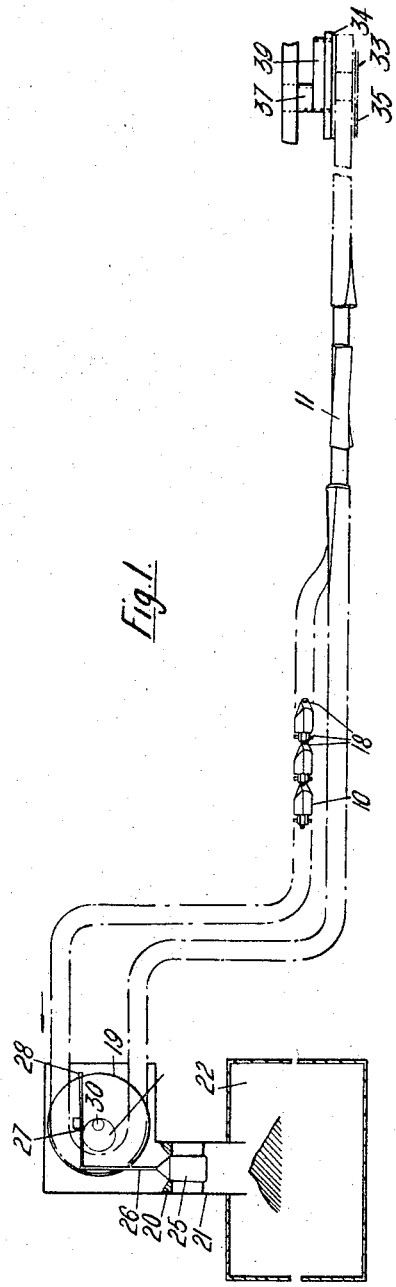
FIG. 1 is a side view of a conveyor system including solids feeding means in accordance with the invention.

The system shown in the drawings comprises an endless bucket-conveyor 10 for transporting very small anthracite (under ⅛ inch) from a fuel storage bunker to a hopper feed boiler. The bucket-conveyor 10 runs through a smooth guide-tube 11 made of a plastics material, and this tube can be secured as required along walls or other supports. As described in the specification of our co-pending application No. 474,286 filed July 23, 1965, the buckets of the conveyor are connected by couplings including pivot pins 18 at right angles. Thus, the chain can deflect sideways or upwards or downwards as necessary.

Figure 7:
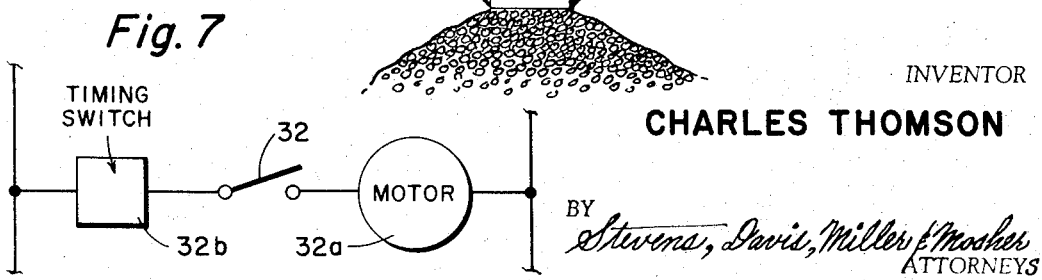
FIG. 7 is a circuit diagram of the control means for the embodiment of FIGS. 1–4.

At the delivery end of the system, the conveyor passes round a discharge pulley 19, where the anthracite falls from the buckets into a well 20. A passage 21 leads from the well 20 into the top of the hopper 22 of the boiler. In this passage are disposed two vertically-spaced rubber seals 23 and 24 having central holes adapted to be closed by a vertically-reciprocable feed piston or plunger 25 used as a closure member for the seals. The spacing of the seals is less than the length of the plunger. The plunger is carried by a rod 26 pivoted at its top to a horizontally extending arm 27 which is in turn pivoted at 28 to a fixed support and which, under the weight of the plunger, bears down on a cam 29 keyed to the drive shaft 30 for the pulley 19. Thus, rotation of the pulley 19 is accompanied by vertical reciprocation of the plunger. FIG. 1 shows the plunger in an intermediate position closing both seals. FIG. 2 shows the plunger in its upper position, closing the seal 24 but permitting discharge of anthracite from the feed chamber between the seals through the seal 23. FIG. 3 shows the plunger in its lower position, closing the seal 23 but permitting entry of anthracite into the feed chamber through the seal 24. FIG. 4 shows the plunger being prevented from moving into its lower position by anthracite which has filled the hopper 22. The cam 29 has moved clear of the arm 27 and freed the spring-loaded operating lever 31 of a micro-switch 32 to move so as to switch off the conveyor drive motor 32a, as shown in FIG. 7.

Before the bucket-chain returns from the discharge pulley 19 to the feeding mechanism 33 at the other end of the system, it is necessary to turn the buckets through 180° so that they are ready to receive more anthracite. If the chain is sufficiently flexible, this turning can be done simply by twisting the guide tube. If the chain is not sufficiently flexible for this to be done, it is necessary to provide additional guide wheels to effect turn-over, as described in the specification of my said application No. 474,286 filed July 23, 1965.

At the feed mechanism 33, the buckets pass round a chain wheel rotatable on a vertical axle and having two side plates 34 and 35 each with inwardly-projecting half bushes which engage with the ends of the pivot pins 18 of the buckets, which pins do not project beyond the boundaries of the chain (i.e. beyond the bodies of the buckets). The upper side plate 34 has an upstanding peripheral wall and a number of apertures of the same shape and size as the top openings of the buckets and so arranged relative to the half bushes as to register with those openings as the buckets pass round the chain wheel. Disposed above the feed plate 34 is a fixed anthracite supply duct 37 which is displaced from the axis of rotation of the chain wheel. The lower portion of the duct 37 has a lateral extension 39 of a generally arcuate shape in plan which progressively overlaps the path of movement of the apertures. The rotary movement of the plate 34 thereby draws anthracite round from the duct 37 into the extension 39 so that it can pass through the apertures into the buckets. The feed mechanism 33 is described in more detail in the specification of my co-pending application No. 479,161 filed Aug. 12, 1965.

A timing switch 32b is provided for switching on the drive motor of the conveyor at regular intervals. The length of each interval is determined in accordance with the capacity of the boiler hopper and the maximum consumption rate of the boiler to ensure that the hopper cannot become completely empty. For example, if the boiler has a maximum consumption of 100 lbs. of anthracite in 24 hours and the hopper of the boiler has a storage capacity of 60 lbs. then the timing switch might be set to switch on the conveyor once every 12 hours. The timing switch would be set to stay on for a period long enough to fill the hopper completely if the hopper were empty at the start of the cycle. The plunger 25 and associated micro-switch 32 ensure that the conveyor is stopped if the hopper is full before the end of the period pre-set on the timing switch. An advantage of this form of control is that the timing switch can be set so that the conveyor does not run at night.

FIGURE 5 shows a modified arrangement of feed means having a plunger 25a adapted to close the aperture in a seal 23a at the top of the hopper 22. The plunger 25a is carried by a rod 26a pivoted at its top to a horizontally extending arm 27a which is in turn pivoted at 28a to a fixed support and which, under the weight of the plunger, engages above a flange 27b on an arm 27c also pivoted at 28a but capable of relative angular movement relative to the arm 27a. The flange 27b bears down on top of the cam 29. If the plunger 25a is prevented from moving into its lowest position by anthracite which has filled the hopper 22, the arm 27c still continues to follow the cam 29 and consequently moves angularly relative to the arm 27a. Switches 103 and 104, discussed in detail later are arranged to be operated by this relative movement to control the drive motor. The drive motor cannot re-start until the proper switch is turned on as a result of the arms 27a and 27c returning to their original position when the movement of the plunger 25a is no longer hindered by anthracite in the hopper. A timing switch is also provided as described above. To ensure that the plunger will be at, or near, the bottom of its stroke whether the mechanism has stopped because the boiler is full, or because the timing switch has switched off, the arrangement shown in FIGURE 6 is employed. In this arrangement current supply to a drive motor 101 is controlled by a timing switch 102 and a normally open contact switch 103 in series and a normally closed contact switch 104 arranged in parallel with the timing switch 102 and the switch 103. The switches 103 and 104 are operated by engagement by the arms 27a and 27c respectively. The arm 27a contacts the switch 103 (which acts as a stop) before the arm 27c operates the switch 104. When the arms descend and the boiler hopper is not full, the switch 103 is first closed and provides a second circuit to the motor. The switch 104 is then opened on the downstroke by the arm 27c, but the motor continues to run if the timing switch contacts are closed and the switch 103 is closed. As the arm 27c ascends the switch 104 closes, and when the arm 27c has travelled still further, the switch 103 opens. The plunger now goes to the top of its stroke, and descends almost to the bottom, where this switching sequence is repeated.

The operation of the embodiment of FIGS. 5 and 6 is as follows:

FIG. 5 shows the members in the position they occupy when the plunger 25a is approaching the limit of its downward movement in ordinary operation (i.e., when the container beneath the seal 23a is not full).

Figure 5A:
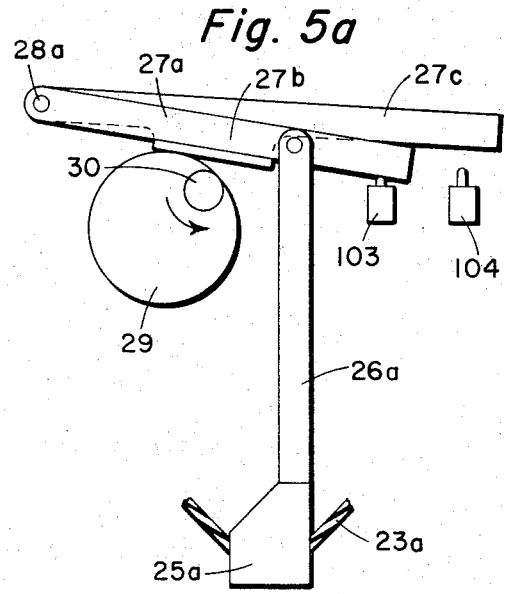

FIG. 5a shows the position of the members when the plunger 25a has just reached the limit of its downward movement. Note that the arm 27a has contacted the switch 103 so as to close it.

Figure 5B:
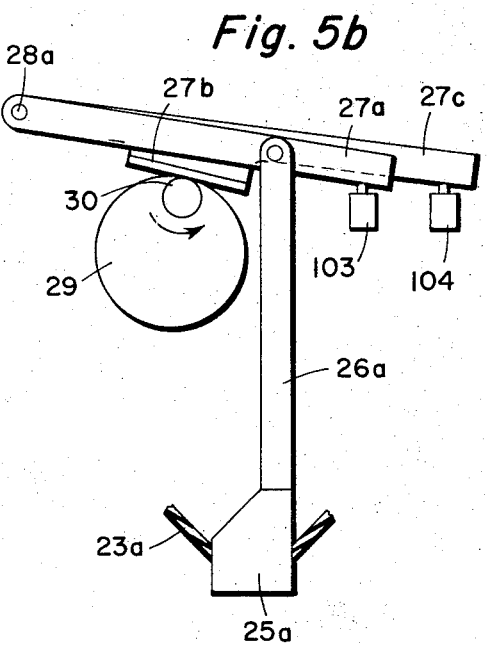

FIG. 5b shows the position of the members shortly after that shown in FIG. 5a. The continued rotation of the cam 29 has lowered the arm 27c (which has fixed to it the flange 27b bearing on the cam) so that the arm 27c contacts and opens the switch 104.

Continued rotation of the cam then raises the arm 27c so that the members return first to the position of FIG. 5a and then (owing to the arms 27a being lifted by the flange 27b) the positions of FIG. 5. Thus the switches are operated as described above.

The plunger continues to the top of its stroke and descends almost to the bottom when the switching sequence is repeated.

Figure 5C:
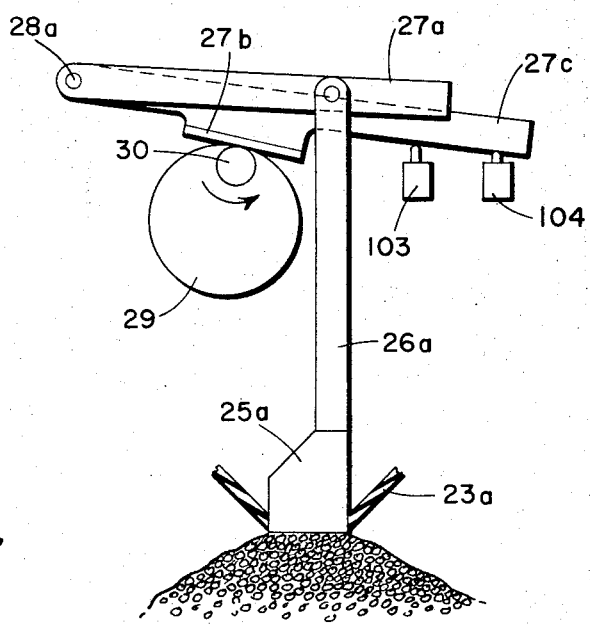

If the container beneath the seal 23a is full, instead of the members moving from the position of FIG. 5 to the position of FIG. 5a, they move into a different position shown in FIG. 5c. As shown in FIG. 5c, continued downwards movement of the arm 27a is prevented by the plunger 25a engaging material in the container. Therefore, the arm 27a cannot contact the switch 103, which remains open. However, the rotation of the cam lowers the arm 27c so that it contacts and opens the switch 104. Thus, both of switches 103 and 104 are open and the drive motor 101 stops. When the level of materials in the container falls, the plunger 25a moves down so that the members assume the position of FIG. 5b. The arm 27a thus contacts and closes the switch 103 so that the motor 101 starts.

Timing switch 102 operates irrespective of the positions of the members. Since the circuit is as shown in FIG. 6, if the timing switch is open, as soon as the switch 104 is opened by the arm 27c, the motor will stop. Opening of the switch 104 by the arm 27c occurs when the arm 27c is in its lowest position and, because the arm 27a is carried by the flange 27b on the arm 27c, the arm 27a, and the plunger 25a carried thereby, must be in the lowest possible position (FIG. 5b or 5c) when the motor stops.

The construction of the conveyor 10 and the feed mechanism 33 per se are, as hereinbefore mentioned, the subject of our co-pending applications Nos. 474,286 and 479,161 and, per se, form no part of the present invention. Any suitable arrangements may be used for the same purposes.

The conveyor may be driven by any suitable form of drive motor through a chain wheel of the conveyor.

I claim:

1. An apparatus for feeding material into an inlet, said apparatus comprising a closure member vertically reciprocal to open and close said inlet, feed means for supplying solids above said inlet, control means for said feed means, and driving means responsive to operation of said feed means for continuously reciprocating said closure member during operation of said feed means to permit the flow of solids through said inlet, said closure member including means for detecting the rise of the level of solids below said inlet to a predetermined height and for operating said control means to render said feed means inoperative.

2. An apparatus according to claim 1 wherein said driving means comprises an operating member connected to the closure member and a driving member adapted to engage said operating member to control raising and lowering of the closure member, said driving member being adapted to move relatively to said operating member so as to operate said control means when downward movement of the closure member is prevented by solids reaching said predetermined height.

3. An apparatus according to claim 2 wherein said driving member comprises a cam rotatable in a vertical plane, said operating member comprises an arm supported on said cam, whereby the cam will move away from said arm if downward movement of the closure member is prevented in response to solids reaching said predetermined height, and wherein said detecting means comprises a switch arranged to be operated by said movement of the cam away from the arm.

4. An apparatus according to claim 1 wherein actuation of said control means also renders said driving means inoperative.

5. An apparatus according to claim 4 wherein said feed means and said driving means have a common drive.

6. An apparatus according to claim 5, wherein said control means includes a timing switch for switching the driving means and feed means on and off at pre-determined intervals.

7. An apparaatus according to claim 6 for use with means for consuming or removing at a known maximum rate solids fed through said inlet into a container, wherein the timing switch is arranged to switch on the feed means at intervals less than the minimum time necessary for the container contents to be consumed or removed and to switch the feed means off after a period sufficient to fill the container if empty at the time of switching on.

8. An apparatus according to claim 7 wherein said control means is so arranged that, irrespective of the position of the closure member when the timing switch switches off, the driving means continues to operate until the closure member is in position closing said inlet.

9. An apparatus according to claim 8 wherein the control means includes a switch which must be closed as a result of the closure member reaching its position closing said inlet to maintain the operation of the driving means.

10. An apparatus according to claim 1 further comprising a feed chamber adjacent said inlet and two flexible seals at the ends of said chamber, and wherein said closure member comprises a piston vertically reciprocable through and adapted alternately to open and close apertures in said seals at the ends of said chamber, which seals are spaced vertically apart for a distance less than the length of the piston, the aperture in the lowermost seal constituting said inlet and the aforesaid feed means supplying solids above the uppermost seal.

References Cited

UNITED STATES PATENTS

| 1,051,736 | 1/1913 | Holder | 222—453 X |
| 1,466,273 | 7/1923 | Crouse | 222—67 |
| 2,276,382 | 3/1942 | Francis | 222—56 |
| 2,368,672 | 2/1945 | McNamara | 222—56 X |
| 2,381,505 | 8/1945 | Lindholm | 222—56 |
| 2,408,221 | 9/1946 | Michel. | |
| 2,430,407 | 11/1947 | Nelson. | |

WALTER SOBIN, *Primary Examiner.*